United States Patent [19]

Thomas

[11] Patent Number: 5,235,663
[45] Date of Patent: Aug. 10, 1993

[54] OPTICAL INTERCONNECTS

[75] Inventor: Michael E. Thomas, Milpitas, Calif.

[73] Assignee: National Semiconductor Corporation, Santa Clara, Calif.

[21] Appl. No.: 898,781

[22] Filed: Jun. 12, 1992

Related U.S. Application Data

[63] Continuation-in-part of Ser. No. 611,909, Nov. 9, 1990, Pat. No. 5,123,078.

[51] Int. Cl.$^5$ ................................................ G02B 6/12
[52] U.S. Cl. ...................................... 385/130; 385/14; 385/129
[58] Field of Search ................ 385/180, 129, 131, 132, 385/14, 15, 16, 122

[56] References Cited

U.S. PATENT DOCUMENTS

| | | | |
|---|---|---|---|
| 4,693,543 | 9/1987 | Matsumura et al. | 385/14 |
| 4,730,330 | 3/1988 | Plihal et al. | 385/14 |
| 4,760,568 | 6/1988 | Hine | 385/14 X |
| 4,861,126 | 8/1989 | Dautartas et al. | 385/14 X |
| 4,901,321 | 2/1990 | Blondeau et al. | 385/14 X |
| 4,919,507 | 4/1990 | Evans et al. | 385/16 X |
| 4,950,044 | 8/1990 | Makita | 385/16 X |
| 4,989,934 | 2/1991 | Zavracky et al. | 385/14 |
| 5,123,078 | 6/1992 | Thomas | 385/130 |

*Primary Examiner*—Georgia Y. Epps
*Assistant Examiner*—Phan T. Heartney
*Attorney, Agent, or Firm*—Irving S. Rappaport; Stephen R. Robinson; William H. Murray

[57] ABSTRACT

An optical interconnect structure, formed on a substrate, includes optical interconnects each of which includes a core member constructed of a material having a first predetermined index of refraction. A cladding layer surrounds each core member. The cladding layer is formed of a material having a second predetermined index of refraction, the magnitude of which is less than the first predetermined index of refraction. At least one optical port exposes at least a portion of the core member of at least one optical interconnect. The optical port may be located on a top portion of an optical interconnect or at one or both ends of an optical interconnect.

27 Claims, 9 Drawing Sheets

OPTICAL INTERCONNECTS

CROSS REFERENCE TO RELATED PATENT APPLICATIONS

This application is a continuation-in-part of copending U.S. patent application Ser. No. 07/611,909, filed Nov. 9, 1990, entitled Optical Interconnects.

BACKGROUND OF THE INVENTION

The present invention relates to interconnections between electronic components and more particularly to optical interconnections between optoelectronic components.

Delays in electronic circuits have been reduced to a point where interconnect delays are becoming the limiting factor inhibiting yet further increases in speed. Capacitive coupling of traditional metallic interconnects is a major contributor to such delays. The capacitive/inductive coupling between metal lines can also cause substantial signal attenuation even for short metal runs, resulting in diminished signal margins and a concomitant decrease in reliability.

Optical interconnects in conjunction with higher speed optoelectronic technology have been proposed to overcome the limitations of electronic systems using metal interconnects. Such optical interconnect schemes include planar wave guides and optical fibers; see, for example, the paper entitled "Optical Interconnection Between Integrated Circuit Chips" by John A. Neff, Fifth Annual International Electronics Packaging Conference, Proceedings of the Technical Conference, 1985, pp.: 343-50, and the paper entitled "Overview of Optical Interconnections" by Fred J. Lemberger and Paul N. Marshall, Fifth Annual International Electronics Packaging Conference, Proceedings of the Technical Conference, 1985, pp.: 334-42. Although optical interconnect schemes have been proposed, there is a need for an effective way to construct optical interconnects on integrated circuits.

SUMMARY OF THE INVENTION

It is therefore an object of the present invention to provide a method for constructing optical interconnects on integrated circuits.

It is another object of the present invention to provide a method for constructing optical interconnects on an integrated circuit which is compatible with integrated circuit processing technology.

It is a further object of the present invention to provide a method for constructing fiber optic interconnects for enabling optical interconnections between integrated circuits and interconnecting devices at a board level.

It is yet another object of the present invention to provide a method for constructing fiber optic interconnects with or without an opaque protective layer.

It is still another object of the present invention to provide a fiber optic interconnect system in which the interconnect support structure also forms a cladding which surrounds the core glass.

It is a further object of the present invention to construct a three dimensional array of fiber optic interconnects.

These and other objects are obtained by defining at least one optoelectronic transmitting device and at least one optoelectronic receiving device in or on a substrate. A first layer of support material is formed over the substrate. Vias are formed in the first layer of support material in order to expose the underlying optoelectronic transmitting and receiving devices. A layer of core glass, having a first predetermined index of refraction, is formed over the first layer of support material into contact with the underlying devices through the vias. The core glass is patterned, defined and etched into a first level of optical interconnects. A second layer of support material is formed over and around the core glass optical interconnects.

Vias are formed through the second support material layer thereby exposing surfaces of the underlying first level optical interconnects at predetermined locations. A second layer of core glass is then formed over the support material layer into the vias and into contact with the exposed surfaces of the underlying first level optical interconnects. The second layer of core glass is patterned, defined and etched into a second level of interconnect lines. The support material is then selectively etched away leaving only the core glass interconnects with free space therebetween.

A dielectric cladding layer is then formed around the core glass free space structure. The cladding layer has a second predetermined index of refraction which, in combination with the index of refraction of the core glass material, satisfies the requirements of an optical wave guide. An opaque protective jacket is then formed around the cladding layer. The resultant optical interconnect system comprises optical fiber guides each with a transparent core, transparent cladding and an opaque protective jacket.

Multiple levels of the optical interconnect system can be made by repeating the steps of forming the support layer and optical interconnects prior to etching the support layer material away. After the desired number of optical interconnect levels have been formed, all of the support layer material is selectively etched away. The remaining core glass is then covered by the cladding layer and protective jacket. An optical port may be created by forming a via through the cladding layer and protective jacket in the upper most optical interconnect level. An optical port may also be created in an edge of the device by etching the cladding layer and protective jacket away from an end of an optical interconnect.

In an alternate embodiment of the present invention, the support layer material is a glass having the desired index of refraction. In this embodiment, the support glass material is not etched away and the resultant optical interconnects comprise a transparent core of core glass material surrounded by a transparent cladding of support glass material. An optical port may be created by forming a via through the support glass material in the upper most optical interconnect level. An optical port may also be created in an edge of the device by etching the support glass material away from an end of an optical interconnect.

In another alternate embodiment of the present invention, after the support material is selectively etched away leaving only the core glass interconnects with free space therebetween, a dopant is placed on the outer surfaces of the core glass interconnects. The dopant is then thermally diffused into the core glass material forming a graded index of refraction from the surface inward. This graded region has a lower index of refraction than the core material and facilitates a smooth undulating propagation of light through the interconnects. An optical port may be created by forming a via through that portion of the core glass material having the graded index of refraction in the upper most optical interconnect level. An optical port may also be created in an edge of the device by etching the material having the graded index of refraction away from an end of the optical interconnect.

In yet another embodiment of the present invention, the optical interconnect structure comprises at least one feed through optical interconnect having optical ports at each end, having an optical port at one end and in the upper portion, or having two optical ports in the upper portion. Such a feed through optical interconnect is usable to conduct light focussed on one optical port from a source which may be located either on or off the substrate to another optical port where it can be sensed by a detecting device or focussed onto an optical port of another optical interconnect located either on or off the substrate.

DETAILED DESCRIPTION OF THE PREFERRED EMBODIMENT

Figure 1A:
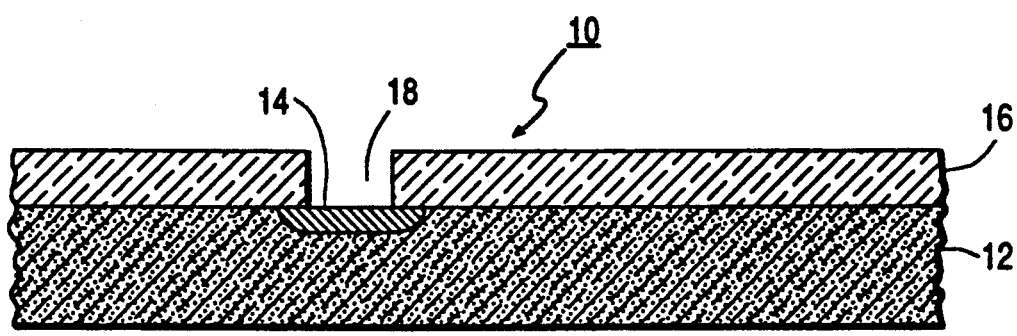
FIGS. 1A through 1I are diagrammatic cross-sectional representations of processing stages of a preferred method for constructing an optical interconnect system in accordance with the present invention.

Although a specific form of the invention has been selected for illustration in the drawing, and the following description is drawn in specific terms for the purpose of describing this form of the invention, this description is not intended to limit the scope of the invention which is defined in the amended claims.

Referring to FIG. 1, particularly to FIG. 1A, there is shown in diagrammatic cross-sectional form, a portion of a substrate, generally designated 10, including at least one optoelectronic emitting device 14, such as, for example, a GaAs light emitting device, disposed in the substrate 12. At least one optoelectronic detecting device (not shown), for example a GaAs photodetection device, is also disposed in the substrate 12. The optoelectric emitting and detecting devices can be either attached to or formed in an appropriate substrate. For the purposes of this detailed description it is assumed that the optoelectronic devices are formed in a semiconductor substrate, for example, gallium arsenide. It should also be noted that the optoelectronic emitting and detecting devices could be attached to a multi-chip carrier which devices may also be optically connected using the optical interconnects of the present invention.

A layer 16 of support material is formed on the surface of the substrate 12. In the preferred embodiment, the layer 16 comprises a layer of a glass material which is formed preferably by chemical vapor deposition (CVD) to a predetermined thickness, preferably 10,000 angstroms. It should be noted that the support layer 16 can also comprise a metal, polymeric material, or any material which has sufficient mechanical strength to support a core glass material, has thermal integrity during subsequent processing steps, and is substantially non-reactive with the core glass material. In the preferred embodiment the support layer 16 comprises an undoped CVD silicate glass.

Vias 18 are then defined and etched through the support layer 16 in order to expose underlying optoelectronic transmitters and receivers. The vias 18 are preferably patterned using mask and photoresist techniques which are known in the art. The vias 18 are then etched through the support layer 16 using an etchant which attacks the support layer material but which is substantially unreactive with the substrate material and which is not detrimental to the underlying optoelectronic device. Since the support layer 16 comprises an undoped silicate glass, it is preferred that the etchant be a plasma etch gas comprising a $CHF_3/O_2$ mixture; preferably five parts $CHF_3$ to one part $O_2$.

Figure 1B:
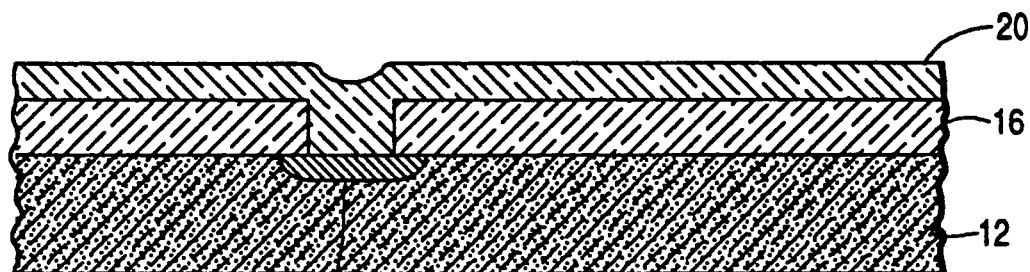
Figure 1C:
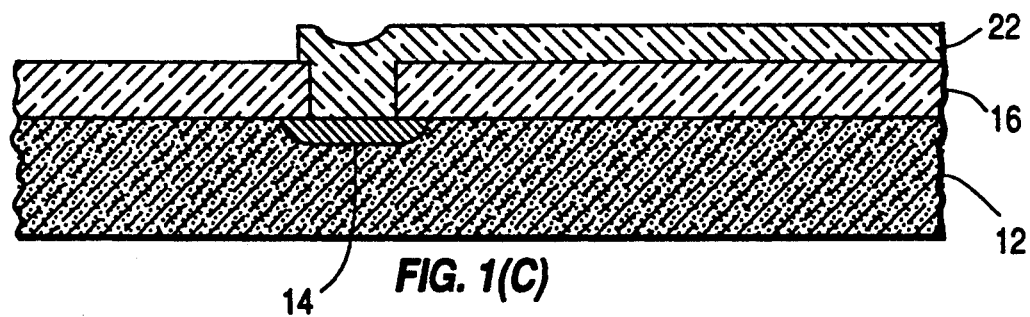
Figure 1D:
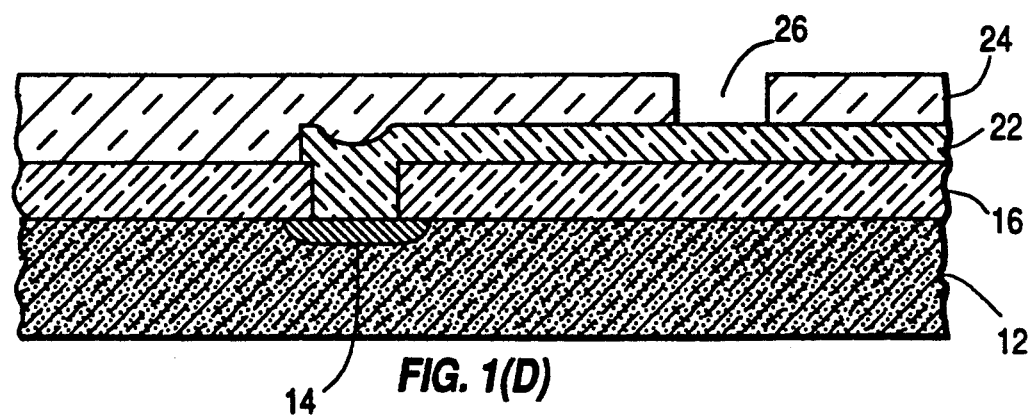

Referring now to FIG. 1B, a layer 20 of core glass, having a predetermined index of refraction $n_1$, is deposited over the support layer 16 into the vias 18 in contact with the underlying optoelectronic devices. In the preferred embodiment, the core glass comprises silicon nitride which is preferably deposited by CVD as known in the art, to a predetermined thickness, preferably approximately 1 micron. The core glass material could also be a borophosphosilicate glass (BPSG).

The core glass layer 20 is then patterned, defined and etched into optical interconnects 22 (see FIG. 1C) using mask and photoresist techniques which are known in the art. The core glass layer 20 is etched into the defined optical interconnect pattern using a first etchant, which can be either a fluorinated or chlorinated plasma such as a $BCl_3/Cl_2/CF_4$ plasma which attacks the core glass material at a faster rate than it attacks the support layer material.

A second support layer 24 is formed over the core glass interconnects 22 to a predetermined thickness, preferably approximately 10,000 angstroms, using CVD as known in the art. The material of the second support layer 24 is preferably the same as that of the first support layer 16. A second set of vias 26 is then defined and etched through the second support layer 24 in order to expose surfaces of the underlying core glass interconnects 22 at predetermined locations. The vias 26 are patterned and defined using conventional mask and photoresist techniques and are etched using a second etchant, preferably $CHF_3/O_2$ or a wet etchant containing buffered HF, which attacks the support layer material at a faster rate than it attacks the core glass material.

Figure 1E:
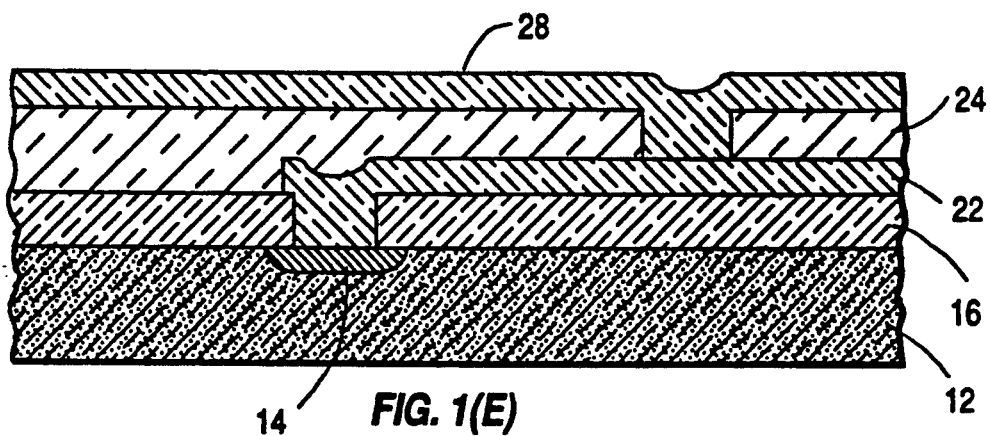
Figure 1F:
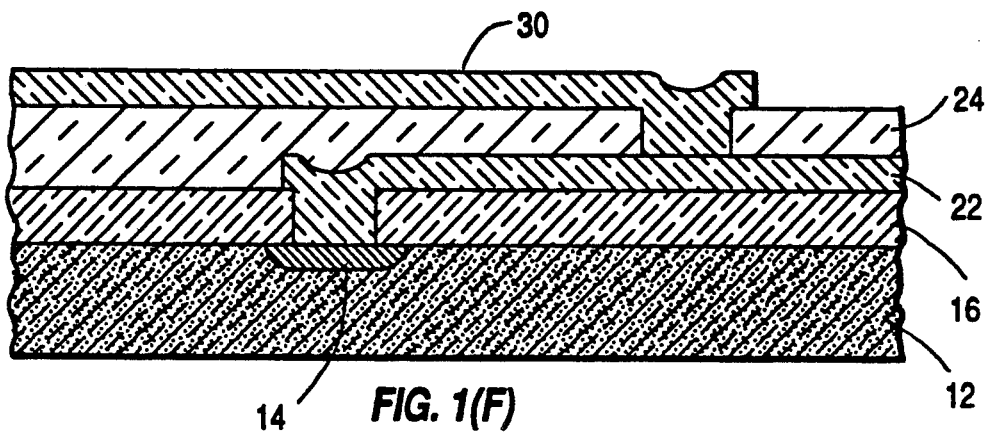
Figure 1G:
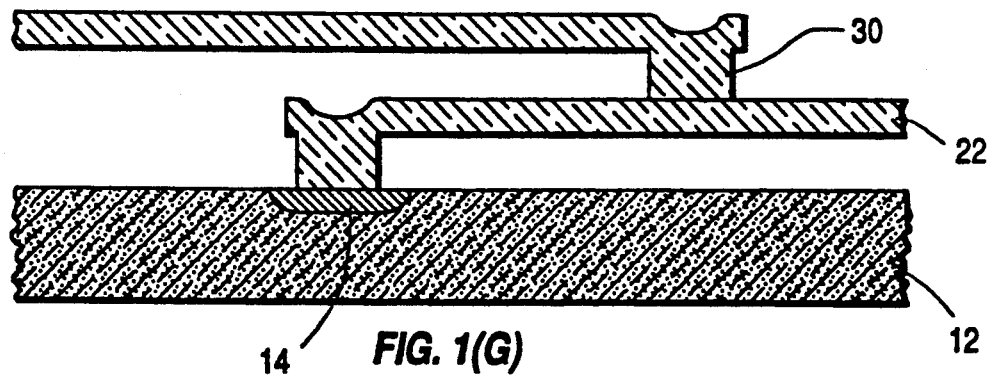

A second level of core glass optical interconnects is constructed by forming a second layer 28 of core glass material over the second support layer 24 into the second set of vias 26 and contacting the exposed surfaces on the underlying core glass interconnects 22 as shown in FIG. 1E. The material of the second core glass layer 28 is the same as that of the first core glass layer, having an index of refraction $n_1$. The second core glass layer 28 is then formed into a second set of core glass optical interconnects 30, see FIG. 1F, using conventional mask and photoresist techniques to define the second interconnect pattern and using the first etchant which attacks the core glass material at a faster rate than it attacks the support layer material. Referring now to FIG. 1G, the support layer material is etched out of the structure using the second etchant, leaving the optical interconnects 22 and 30 surrounded by free space.

Figure 1H:
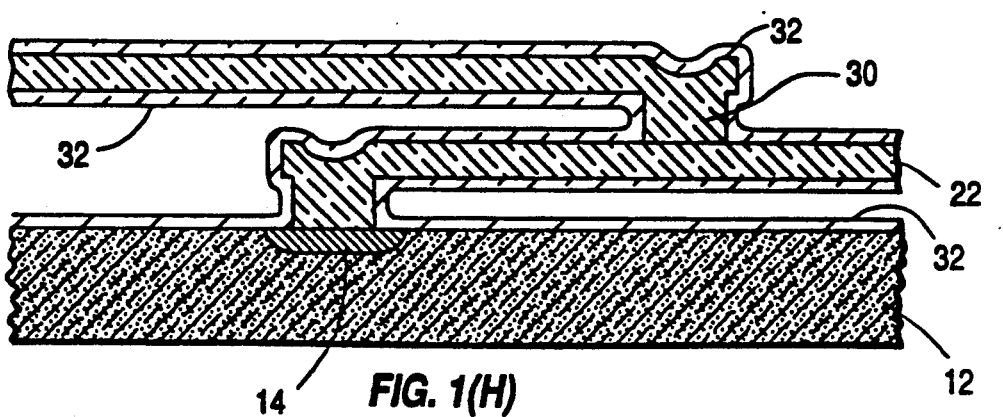
Figure 1L:
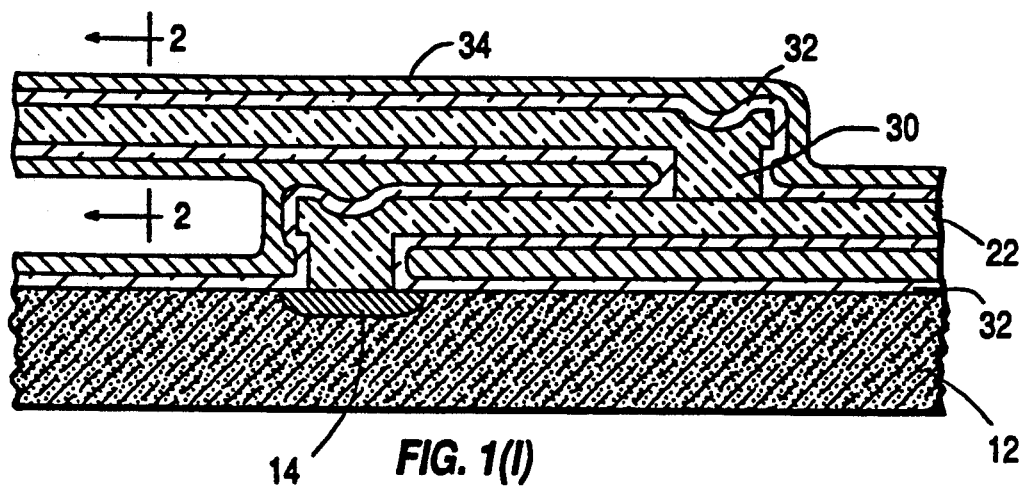

As shown in FIG. 1H, a cladding layer 32 is formed around the core glass interconnects 22 and 30 preferably using CVD. The cladding layer material preferably comprises undoped silicate glass (USG), which has an index of refraction $n_2$ which is less than the index of refraction $n_1$ of the core glass material, in order to satisfy the requirements of an optical wave guide. The cladding thickness is selected to substantially eliminate the escape of light from the core glass material as is known in the fiber optic art.

Figure 2:
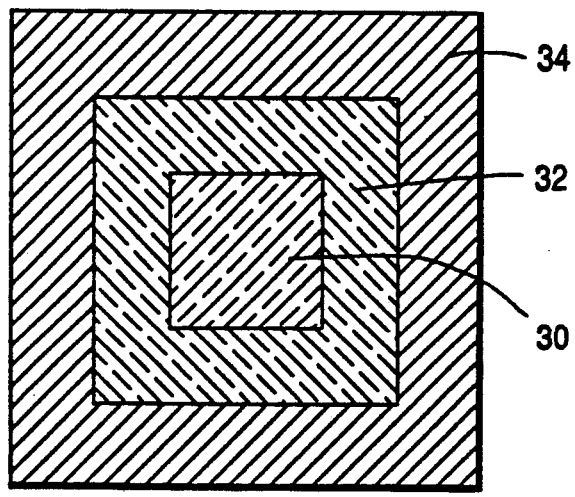
FIG. 2 is a cross-sectional view of an optical interconnect line taken along lines 2—2 of FIG. 1I.

Referring to FIG. 2, an opaque protective jacket 34 is formed around the cladding layer 32. In the preferred embodiment, the protective jacket comprises a metal, preferably a multilayer metal film of tungsten over a sputtered titanium-tungsten alloy, which is formed to a thickness of approximately 2,000 angstroms. FIG. 2 depicts, in diagrammatic form, a cross-section of an optical interconnect 38 taken along line 2—2 of FIG. 1I. As can be seen, the optical interconnect 38 comprises a core glass material 30 having an index of refraction $n_1$ which is surrounded by a cladding layer 32 having an index of refraction $n_2$. The cladding layer 32 is surrounded by a protective jacket 34.

In optical wave guides of the type shown in FIG. 2, it is preferred that the index of refraction $n_1$ of the core glass material be slightly greater than the index of refraction $n_2$ of the surrounding cladding material. This relationship is explained more fully in the textbook entitled "Electromagnetics" by John D. Kraus, Third Edition, 1984, McGraw-Hill, and in particular pages 593-596 of that textbook, the teachings of which are incorporated in this detailed description by reference as if fully set forth herein.

Figure 3:
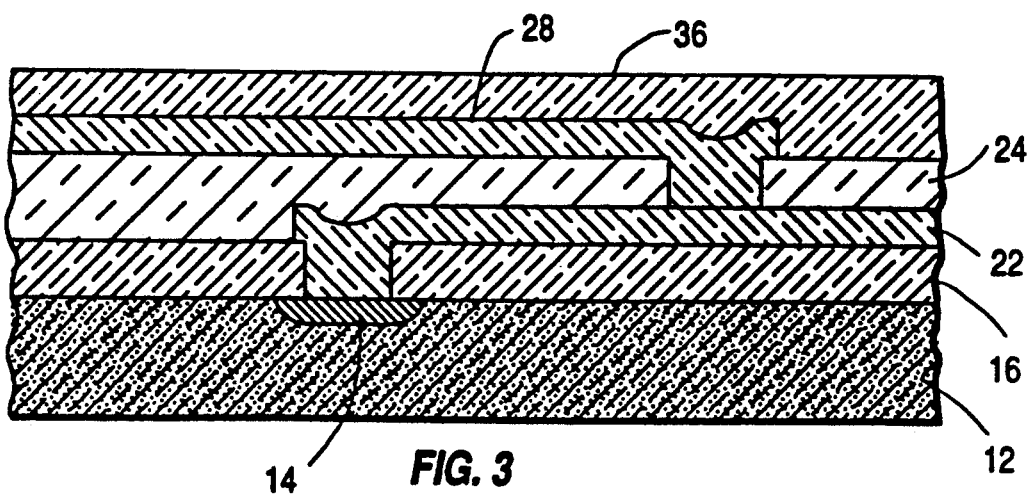
FIG. 3 is a diagrammatic cross-sectional representation of a processing stage of an alternate preferred method for constructing an optical interconnect system in accordance with the present invention.

In an alternate preferred embodiment, the optical interconnects can be formed by using a support layer material having an index of refraction $n_2$. In this alternate preferred embodiment, the processing steps depicted in FIGS. 1A through 1F are performed as previously described using a support layer material having an index of refraction $n_2$. In this alternate embodiment, the support layer material is preferably undoped silicate glass (USG). Referring to FIG. 3, a layer of support material 36, having an index of refraction $n_2$ is formed over the uppermost level of the core glass interconnects thereby causing the core glass interconnects, which have an index of refraction $n_1$, to be surrounded by support glass having an index of refraction $n_2$ as necessary to satisfy the requirements of an optical wave guide. In this alternate preferred embodiment, it is not necessary to etch out the support glass material. If desired, a continuous layer of opaque material can be formed over the complete structure to inhibit optical noise from external sources.

In another alternate preferred embodiment, the processing steps depicted in FIGS. 1A through 1G are performed as previously described. A material, which changes the index of refraction of the core glass material, is diffused into the core glass material through the surfaces of the core glass interconnects. For example, a dopant is placed on the outer surfaces of the core glass interconnects 22 and 30. In the preferred embodiment, the material of the core glass interconnects is phosphosilicate glass (PSG) having an index of refraction $n_1$ and the dopant is boron preferably from a diborane source. The boron dopant is then diffused into the core glass material preferably by heating. This causes a concentration gradient, and a concomitant increasing index of refraction gradient from the outer surface of the interconnects inward. If desired, a continuous layer of opaque material can be formed around the interconnects as depicted in FIG. 1I.

In still another alternate preferred embodiment, the increasing index of refraction gradient from the surface of the optical interconnects inward, is created by forming a cladding layer 32, which contains a dopant, around the interconnects 22 and 30 as shown in FIG. 1H. The dopant from the cladding layer 32 is diffused into the core glass material of the interconnects preferably by heating.

In yet another alternate preferred embodiment, the increasing index of refraction gradient is created by generating a graded index of refraction material during the cladding deposition process. For example, while forming the cladding layer 32 (see FIG. 1H) the dopant, for example boron or phosphorous in the deposited glass, can be increased by increasing the amount of dopant gas in the CVD process with time.

Figure 4A:
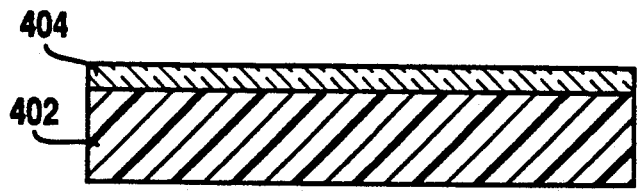
FIGS. 4A through 4F are diagrammatic cross-sectional representations of processing stages of another alternate preferred method for constructing an optical interconnect system in accordance with the present invention.
Figure 4B:
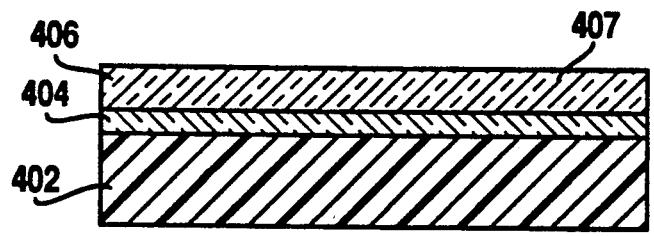

Referring now to FIGS. 4A through 4F, there is depicted, in diagrammatic cross-sectional form, processing stages of another alternative preferred method for constructing an optical interconnect system in accordance with the present invention. Referring to FIG. 4A, a first layer 404 of cladding material is formed on a substrate 402 preferably using CVD. The cladding layer material preferably comprises undoped silicate glass (USG), which has an index of refraction $n_2$. The cladding thickness is selected to substantially eliminate the escape of light from core glass material as is known in the fiber optic art.

Referring to 4B, a layer 406 of core glass material is formed over the cladding layer 404. As set forth previously, the core glass material has a predetermined index of refraction $n_1$ which is slightly greater than the index of refraction $n_2$ of the material of the first cladding layer 404. In the preferred embodiment, the core glass comprises silicon nitride which is preferably deposited by CVD as known in the art, to a predetermined thickness, preferably approximately one micron. The core glass material could also be a borophosphosilicate glass (BPSG).

Figure 4C:
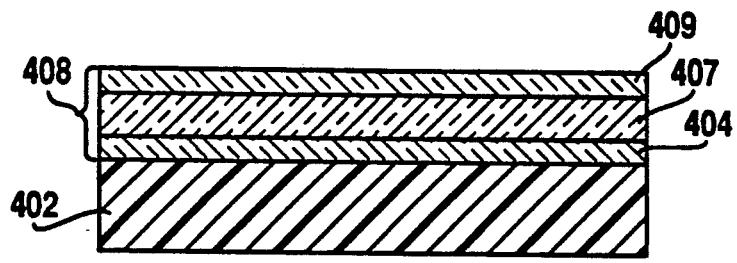

The core glass layer 406 is patterned, defined and etched into optical interconnects 407 using mask and photoresist techniques which are known in the art. The core glass layer 406 is etched into the defined optical interconnect pattern using a first etchant, which can be a fluorinated or chlorinated plasma such as a $BCl_3/Cl_2/CF_4$ plasma which attacks the core glass material at a faster rate than it attacks the underlying cladding layer material. In the embodiment depicted in FIGS. 4A through 4F, at least one of the optical interconnects 407 extends from one end of the substrate to the other. A second layer 409 of cladding material is formed over the core glass interconnects 407 to a predetermined thickness, preferably approximately 10,000 angstroms, preferably using CVD as known in the art. Although the material of the second cladding layer 409 is preferably the same as that of the first cladding layer 404, it does not have to be. The required feature of the second cladding layer 409 is that it has an index of refraction $n_2$ which is less than the index of refraction $n_1$ of the core glass material in order to satisfy the requirements of an optical wave guide as previously stated in this detailed description. The optical interconnect 407 extending from one end of the substrate to the other and which is surrounded by the first 404 and second 409 layers of cladding material define a feed through optical interconnect 408 as depicted in FIG. 4C.

Figure 4D:
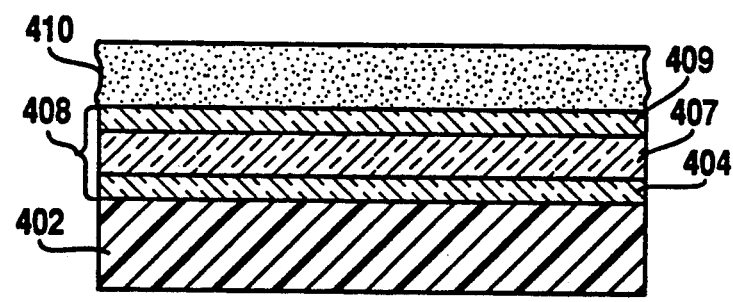
Figure 4E:
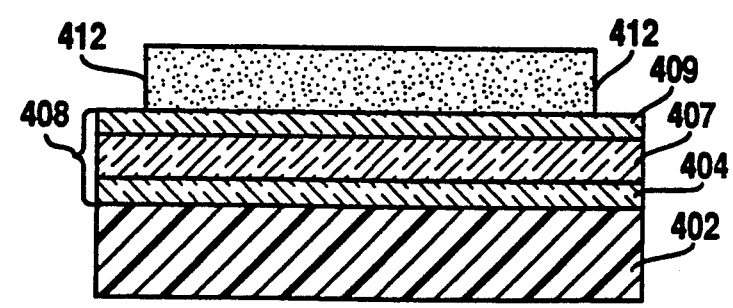
Figure 4F:
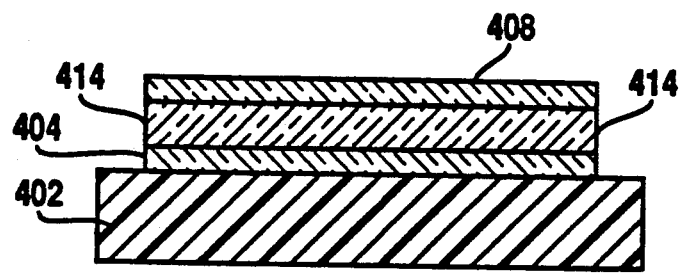

Referring now to FIG. 4D, a layer of photoresist material 410 is disposed over the feed through optical interconnect 408. The photoresist 410 is exposed to define end portions 412 as is known in the art. Referring to FIG. 4F, using the photoresist with the defined end portions 412 as a mask, the end portions of the feed through optical interconnect 408 are etched away using either a selective etchant which reacts with the cladding material and the core glass material but which stops on the substrate 402, or a timed etch in order to form optical ports 414 at each end of the feed through optical interconnect 408. It is preferred that a reactive ion etching (RIE) plasma process is used for a time sufficient to remove the material. In the preferred embodiment the etchant is $CHF_3$ & $O_2$ at 5:1, the flow of $CHF_4$ preferably being approximately 80 sccms at 50 millitorr.

An optical feed through connector such as that depicted in FIG. 4F is usable to conduct light focussed on the optical port at one end of the feed through optical interconnect, through the optical interconnect, exiting at the optical port on the other end. Consequently, the feed through optical interconnect 408 can conduct optical signals from a light emitting device located off the substrate 402 to an optical electronic detecting device also located off the substrate 402.

Figure 5A:
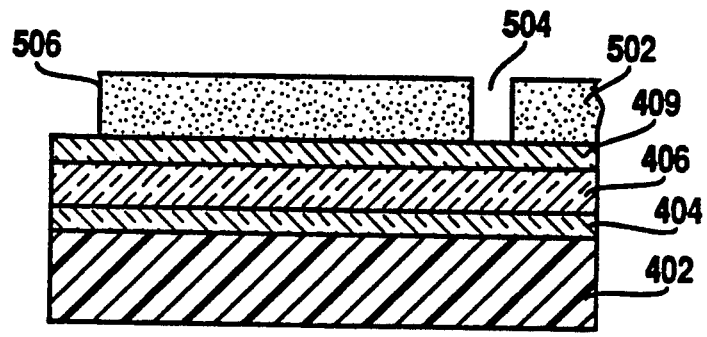
FIGS. 5A through 5B diagrammatic cross-sectional representations of processing stages of a preferred method for forming optical ports in an optical interconnect structure in accordance with the present invention.
Figure 5B:
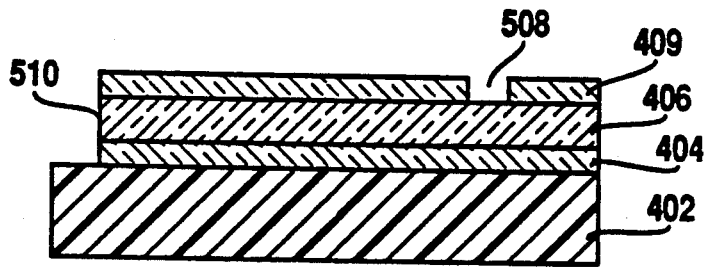

An optical interconnect having an optical port on the upper surface thereof and at one end thereof is constructed as shown in FIGS. 5A and 5B. Photoresist material 502 is disposed over the second cladding layer 409 and exposed in a pattern including at least one opening 504 and one edge 506. Using the exposed photoresist as a mask, a first etchant which attacks the material of the second cladding layer 409 but does not attack the core glass material is used to form a top optical port 508 and to etch off the material of the second cladding layer 409 up to the edge 506. The core glass material exposed through the top optical port 509 is then protected by, for example, removing the photoresist layer 502, replacing it with another photoresist layer (not shown) which is exposed and developed to form the edge pattern 506 only. A second etchant which attacks the core glass material and the material of the first cladding layer 404 but stops on the substrate material is used to form an end optical port 510. It should be noted that the second etchant could be one which attacks the core glass material only, stopping on the first cladding layer 404. Such an etchant would still be sufficient to form the optical port 510 in the end of the optical interconnect. It should be noted that this is also the case when forming optical ports at the ends of the optical interconnects of the embodiments depicted in FIGS. 4, 8 and 10.

Figure 6A:
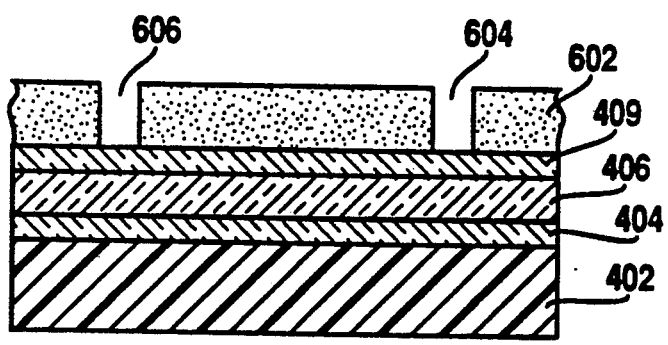
FIGS. 6A and 6B are diagrammatic cross-sectional representations of processing stages of an alternate preferred method for constructing optical ports in an optical interconnect structure in accordance with the present invention.
Figure 6B:
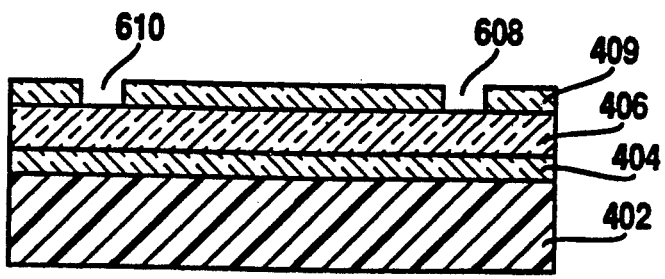

An optical interconnect having more than one optical port on the upper surface thereof is constructed as shown in FIGS. 6A and 6B. Photoresist material 602 is disposed over the second cladding layer 409 and exposed in a pattern including at least a first opening 604 and a second opening 606. Using the exposed photoresist as a mask, a first etchant which attacks the material of the second cladding layer 409 but does not attack the core glass material is used to form top optical ports 608 and 610.

Figure 7A:
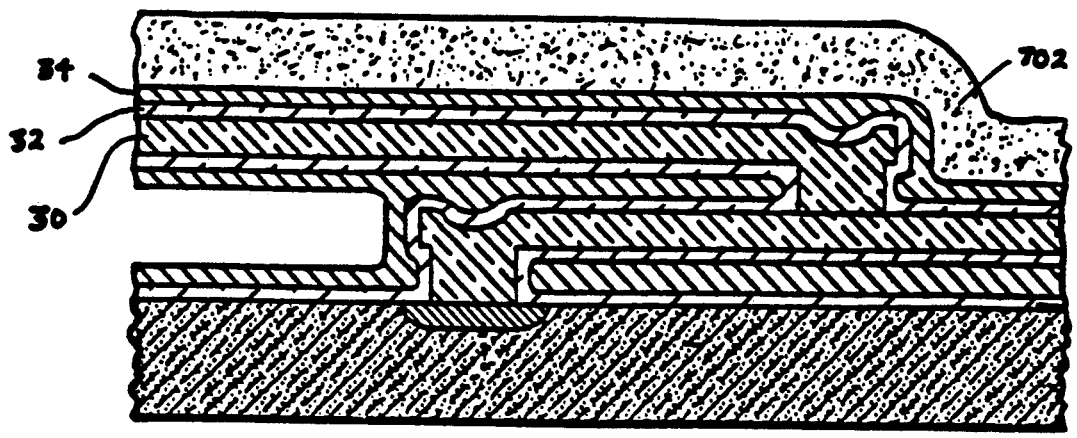
FIGS. 7A through 7C are diagrammatic cross-sections representations of processing stages of a preferred method for constructing optical ports in the optical interconnect structure depicted in FIG. 1I.
Figure 7B:
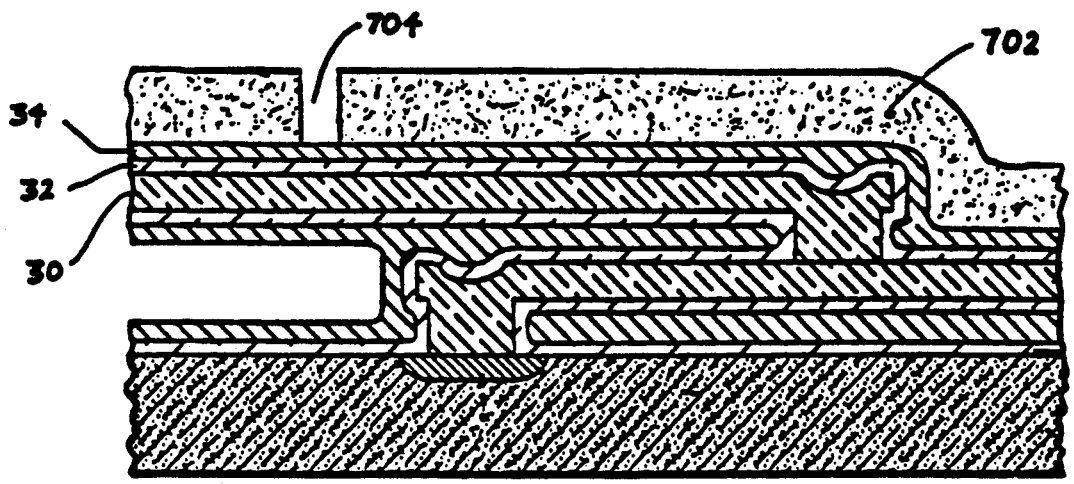
Figure 7C:
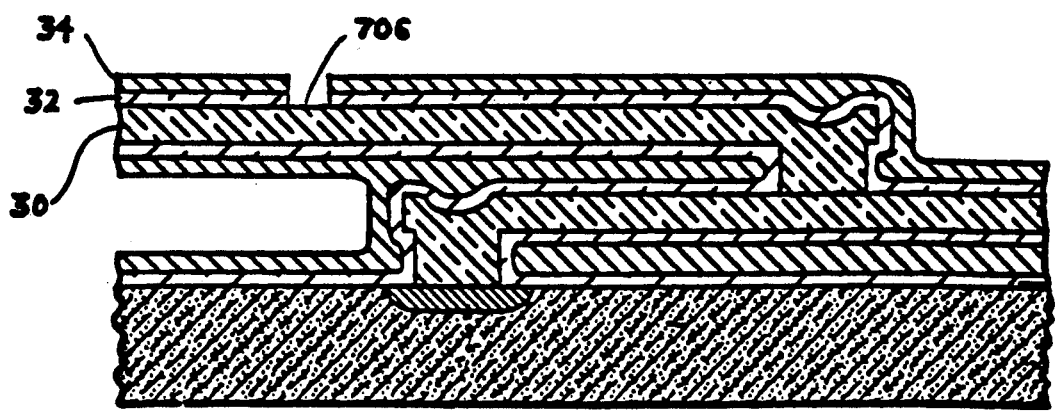

Referring now to FIGS. 7A through 7C, there is shown processing steps for forming at least one optical port in the upper portion of the top most optical interconnect level of the structure depicted in FIG. 1I. A layer of photoresist 702 is formed over the top optical interconnect as shown in FIG. 7A. The photoresist is patterned, exposed and developed to form at least one opening 704 which exposes a predefined portion of the protective layer 34 of the top most interconnect. The structure is then etched using an etchant which attacks the material in the protective layer 34 and cladding layer 32 but stops on the core glass layer 30. The photoresist is then removed leaving an optical port 706 in the top most optical interconnect.

Figure 8A:
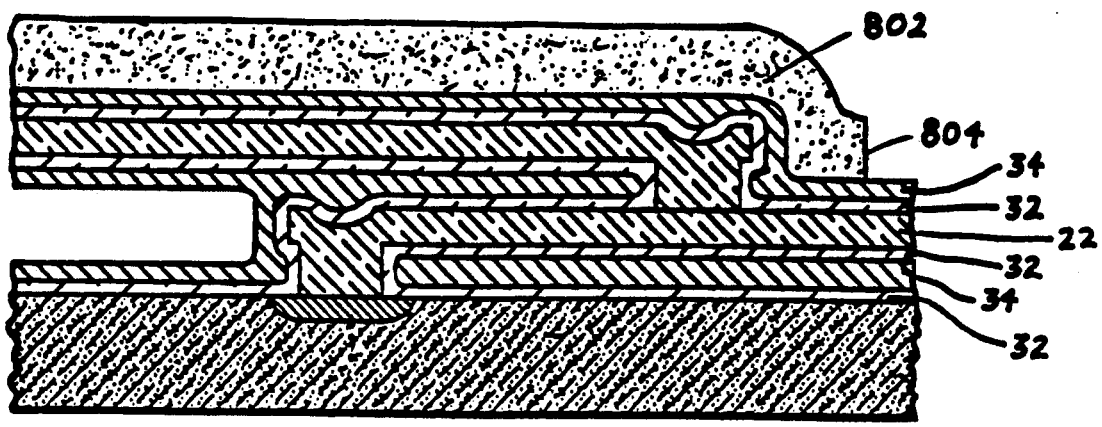
FIGS. 8A and 8B are diagrammatic cross-sectional representations of processing stages of an alternate preferred method for constructing optical ports in the optical interconnect structure depicted in FIG. 1I.
Figure 8B:
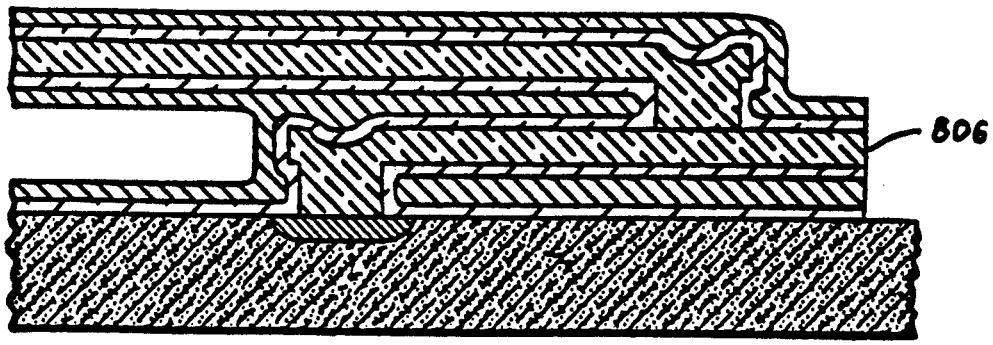

FIGS. 8A and 8B depict process steps used to form an end optical port in the optical interconnect structure depicted in FIG. 1I. A layer of photo resist 802 is formed over the upper surface of the optical interconnect structure. The photo resist is patterned, exposed and developed leaving at least one edge portion 804. The structure is then etched as shown in FIG. 8B, using an etchant which attacks the materials in the protective and cladding layers as well as the core glass material, but stops on the substrate material, to form the optical port 806 at the edge of the structure. It should be noted that a combination of top optical ports and side optical ports can be fabricated using the processes described above.

Figure 9A:
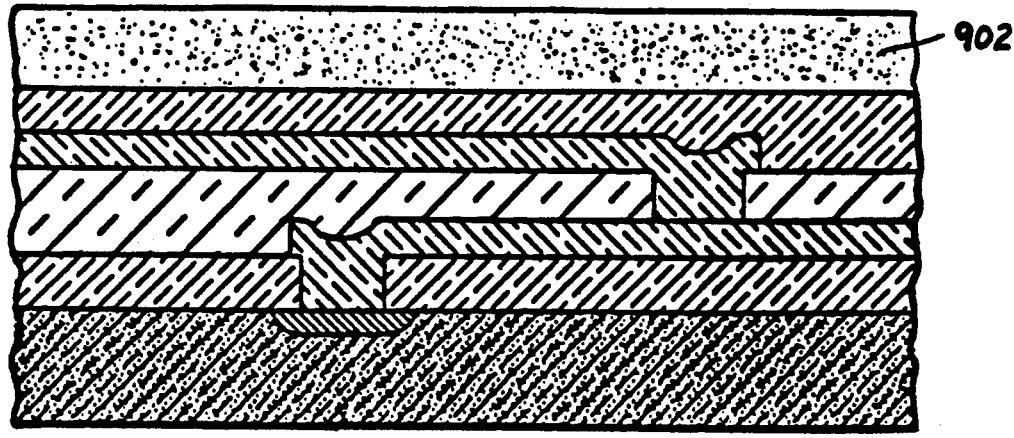
FIGS. 9A through 9C are diagrammatic cross-sectional representations of processing stages of a preferred method for constructing optical ports in the optical interconnect structure depicted in FIG. 3.
Figure 9B:
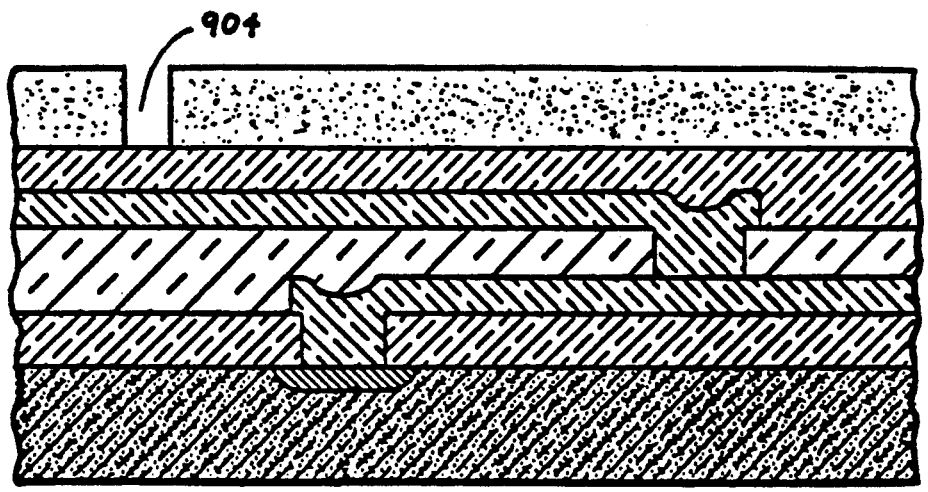
Figure 9C:
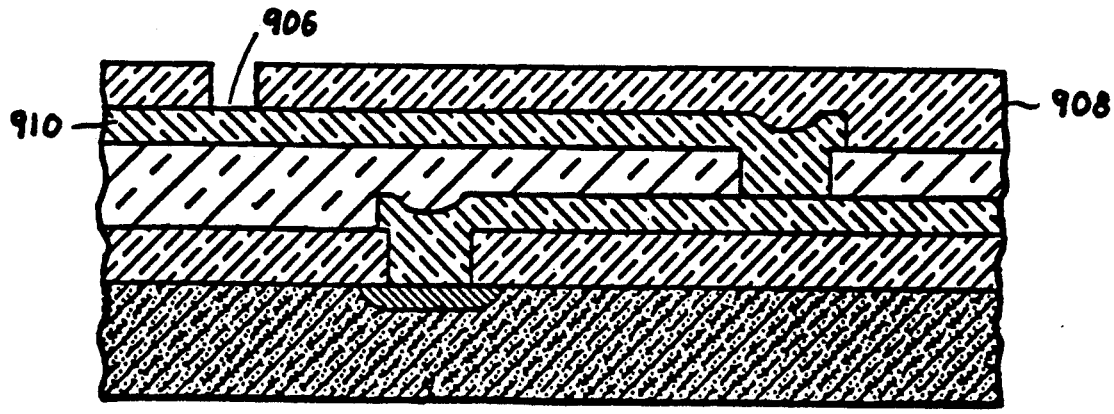

Referring now to FIGS. 9A through 9C, there is shown processing steps for forming at least one optical port in the upper portion of the top most optical interconnect level of the structure depicted in FIG. 3. The optical port 906 is formed substantially in the same way as the optical port 706 of FIG. 7C was formed but in this case using an etchant which reacts with the upper cladding layer material 908 but stops on the core glass material 910.

Figure 10A:
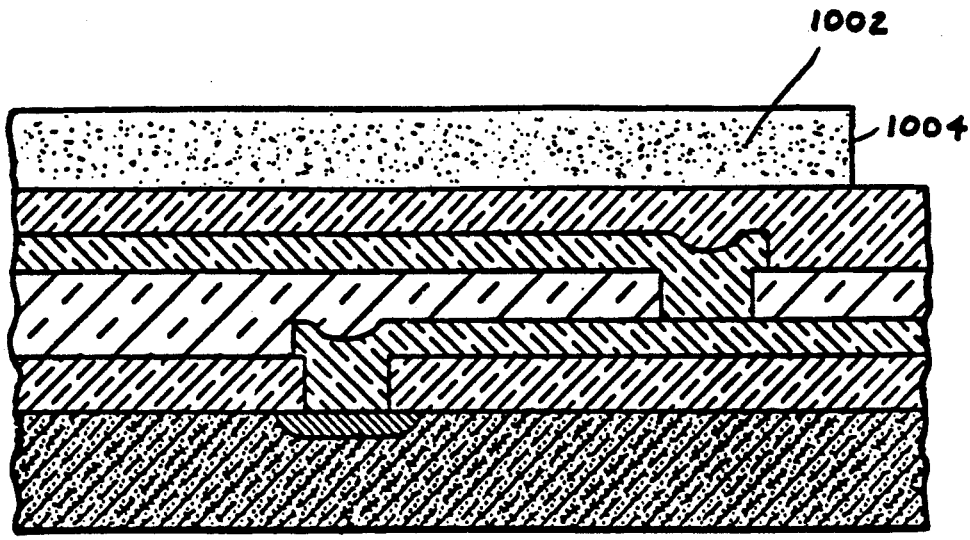
FIGS. 10A and 10B are diagrammatic cross-sectional representations of processing stages of an alternate preferred method of constructing optical ports in the optical interconnect structure depicted in FIG. 3.
Figure 10B:
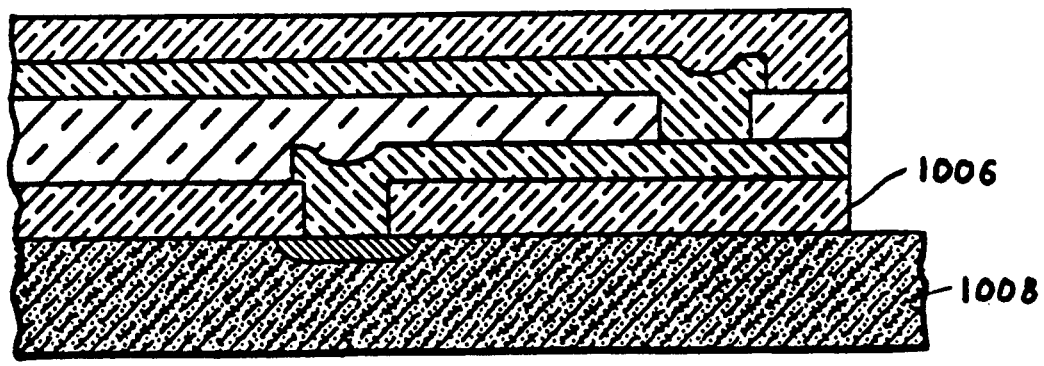

Referring now FIGS. 10A and 10B there is shown processing steps for forming an end optical port 1006 in a structure of the type depicted in FIG. 3. The end optical port 1006 is formed in substantially the same way as the end optical port 806 of FIG. 8B except that the etchant used reacts with the cladding material and core glass material but stops on the substrate 1008.

For that embodiment previously described wherein the outer portion of the core glass material has an increasing index of refraction gradient from the outer surface of the interconnect inward, optical ports are fabricated by patterning apertures and/or edge portions using mask and photoresist techniques which are known in the art, then etching through the outer portion of the optical interconnects stopping at that portion where the index of refraction gradient ceases.

It will be understood that various changes in the details, materials and arrangement of the parts which have been described and illustrated in order to explain the nature of this invention may be made by those skilled in the art without departing from the principles and scope of the invention as expressed in the following claims.

I claim:

1. An optical interconnect structure formed on a substrate, said optical interconnect comprising:
   (a) a core member comprising a material having a first predetermined index of refraction;
   (b) a cladding layer surround said core member, said cladding layer comprising a material having a second predetermined index of refraction the magnitude of which is less than the magnitude of the first determined index of refraction; and
   (c) at least one optical port disposed through said cladding layer exposing a portion of said underlying core member.

2. The optical interconnect structure in accordance with claim 1 wherein said at least one optical port is located on an upper portion of said core member.

3. The optical interconnect structure in accordance with claim 1 wherein said at least one optical port is located on an end portion of said core member.

4. The optical interconnect structure in accordance with claim 1 additionally comprising at least a second level interconnect structure including at least one optical interconnect comprising:
   (a) a core member, comprising a material having a third predetermined index of refraction, the magnitude of which is greater than the magnitude of said second predetermined index of refraction, wherein said cladding layer also surrounds the core member of each optical interconnect of said second optical interconnect structure; and
   (b) at least one optical port in at least one optical interconnect of said second level interconnect structure.

5. The optical interconnect structure in accordance with claim 4 wherein said at least one optical port is located on an upper portion of the core member of at least one of said optical interconnects of said second level interconnect structure.

6. The optical interconnect structure in accordance with claim 4 wherein said at least one optical port is located on an end portion of the core member of at least one of said optical interconnects of said second level interconnect structure.

7. The optical interconnect structure in accordance with claim 4 additionally comprising a protective layer surrounding said cladding layer, said at least one optical port extending through said protective layer as well as said cladding layer.

8. The optical interconnect structure in accordance with claim 4 wherein said substrate comprises a semiconductor substrate.

9. The optical interconnect structure in accordance with claim 4 wherein said substrate comprises a multichip carrier.

10. The optical interconnect structure in accordance with claim 4 wherein at least a portion of at least one of said interconnects intermediate the ends thereof, is spaced from said substrate and from adjacent interconnects.

11. The optical interconnect structure in accordance with claim 7 wherein at least a portion of at least one of said interconnects, intermediate the ends thereof, is spaced from said substrate and from adjacent interconnects.

12. An optical interconnect structure formed on a substrate, said optical interconnect structure including at least one optical interconnect comprising a core member comprising a center portion having a first predetermined index of refraction, and an outer portion having a graded index of refraction, the magnitude of which increases from a value proximate the outer surface, which is less then the magnitude of the predetermined index of refraction, to a value proximate the center portion, which is substantially equal to the magnitude of the first predetermined index of refraction, and at least one optical port disposed through said outer portion exposing at least a portion of said center portion.

13. The optical interconnect structure in accordance with claim 12 wherein at least one optical port is located on an upper portion of said optical interconnect.

14. The optical interconnect structure in accordance with claim 12 wherein said at least one optical portion is located on an end portion of said optical interconnect.

15. The optical interconnect structure in accordance with claim 12 additionally comprising at least a second level interconnect structure including at least one of said optical interconnects, having at least one optical port therein.

16. The optical interconnect structure in accordance with claim 15 wherein said at least one optical port is located on an upper portion of at least one of said optical interconnects in said second level interconnect structure.

17. The optical interconnect structure in accordance with claim 15 wherein said at least one optical port is located on an end portion of at least one of said optical interconnects in said second level interconnect structure.

18. The optical interconnect structure in accordance with claim 15 wherein said substrate comprises a semiconductor substrate.

19. The optical interconnect structure in accordance with claim 15 wherein said substrate comprises a multichip carrier.

20. The optical interconnect structure in accordance with claim 15 additionally comprising a protective layer surrounding each of said optical interconnects wherein said at least one optical port extends through said protective layer as well as the outer portion of said optical interconnect.

21. A method of fabricating an optical interconnect structure on a substrate, said method comprising the steps of:
   (a) forming a first cladding layer over said substrate, said first cladding layer comprising a material having a first predetermined index of refraction;
   (b) forming a core layer over said cladding layer, said core layer comprising a material having a second predetermined index of refraction of a magnitude which is greater than the magnitude of said first predetermined index of refraction;

(c) forming said core layer into a predetermined pattern of optical interconnects;

(d) forming a second cladding layer over said predetermined pattern of optical interconnects, said second cladding layer comprising a material having a third index of refraction of a magnitude which is less than the magnitude of said second predetermined index of refraction; and (e) forming at least one optical port in at least one of said optical interconnects.

22. The method in accordance with claim 21 wherein said at least one optical port is formed in said second cladding layer.

23. The method in accordance with claim 21 wherein said at least one optical port is formed at an end of at least one of said optical interconnects.

24. The method in accordance with claim 21 additionally comprising forming at least a second level optical interconnect structure, said forming comprising the steps of:

(f) forming a second core layer over said second cladding layer, said second core layer comprising a material having a fourth index of refraction of a magnitude which is greater than the magnitude of said third index of refraction;

(g) forming said second core layer into a second predetermined pattern of optical interconnects;

(h) forming a third cladding layer over said second predetermined pattern of optical interconnects, said third cladding layer comprising a material having a fifth index of refraction of a magnitude which is less than the magnitude of said fourth index of refraction; and (i) forming at least one optical port in said third cladding layer.

25. The method in accordance with claim 24 wherein said at least one optical port is formed on the upper portion of at least one optical interconnect in said at least second level optical interconnect structure.

26. The method in accordance with claim 24 wherein said at least one optical port is formed on an end of at least one optical interconnect in said at least second level optical interconnect structure.

27. The method in accordance with claim 24 additionally comprising the step of forming a protective layer around each of said optical interconnects wherein said at least one optical portion extends through said protective layer as well as said cladding layer.

* * * * *